US00RE50200E

(19) United States
(12) Reissued Patent
Lee

(10) Patent Number: US RE50,200 E
(45) Date of Reissued Patent: Nov. 12, 2024

(54) DISPLAY SCREEN WITH ICON

(71) Applicant: Google LLC, Mountain View, CA (US)

(72) Inventor: Sehee Lee, Brooklyn, NY (US)

(73) Assignee: GOOGLE LLC, Mountain View, CA (US)

(21) Appl. No.: 29/786,080

(22) Filed: May 28, 2021

Related U.S. Patent Documents

Reissue of:
(64) Patent No.: Des. 853,442
Issued: Jul. 9, 2019
Appl. No.: 29/643,579
Filed: Apr. 10, 2018

U.S. Applications:
(62) Division of application No. 29/786,072, filed on May 28, 2021, now abandoned, which is a division of application No. 29/725,152, filed on Feb. 21, 2020, now Pat. No. Re. 50,094, which is an application for the reissue of Pat. No. Des. 853,442.

(51) LOC (14) Cl. ..... 14-04
(52) U.S. Cl.
USPC ..... D14/487
(58) Field of Classification Search
USPC ..... D14/485–495; D18/26, 31, 32, 33; D20/11, 12, 23, 24, 25, 29, 30, 31, 32, D20/36, 37, 38
CPC ..... G06F 3/048; G06F 3/0481; G06F 3/0482; G06F 3/04817; G06F 3/04812; H04L 12/581; H04L 12/1813; H04L 51/32
See application file for complete search history.

(56) References Cited

U.S. PATENT DOCUMENTS 5,809,449 A * 9/1998 Harper ..... G06F 3/04817 702/65
D399,837 S * 10/1998 Garguilo ..... D14/486
D437,859 S * 2/2001 Alvarez ..... D14/489
D533,872 S * 12/2006 Ligameri ..... D14/492
D623,195 S 9/2010 La et al.
(Continued)

OTHER PUBLICATIONS

"Multimedia photo and video." iconfinder.com. Jun. 11, 2017. Accessed Feb. 12, 2019. Available online at URL: <https://www.iconfinder.com/iconsets/multimedia-photo-and-video> (Year: 2017). (1 page).

(Continued)

*Primary Examiner* — Darlington Ly
(74) *Attorney, Agent, or Firm* — Plumsea Law Group, LLC

(57) CLAIM

The ornamental design for a display screen with icon, as shown and described.

DESCRIPTION

*More than one reissue application has been filed for the reissue of U.S. Design Pat. No. D. 853,442. The reissue applications are U.S. Application Ser. No. 29/786,080 (the present application), which was filed on May 28, 2021 and is a divisional reissue of U.S. application Ser. No. 29/786, 072, filed on May 28, 2021, now abandoned, which is a divisional reissue of U.S. Application Ser. No. 29/725,152, filed Feb. 21, 2020, issued Re. 50,094 on Aug. 7, 2024, which is reissue of U.S. Application Ser. No. 29/643,579, filed on Apr. 10, 2018, issued as D. 853,442, on Jul. 9, 2019.*
The sole FIGURE is a front view of a display screen with icon, showing the new design.
The broken lines of uneven length show the display screen and form no part of the claimed design.

1 Claim, 1 Drawing Sheet

Matter enclosed in heavy brackets [ ] appears in the original patent but forms no part of this reissue; matter printed in italics indicates the additions made by reissue.

(New)

(56) References Cited

U.S. PATENT DOCUMENTS

| | | | | | |
|---|---|---|---|---|---|
| D667,457 | S | | 9/2012 | Wujcik et al. | |
| D676,870 | S | | 2/2013 | Steele et al. | |
| D688,703 | S | | 8/2013 | Phelan | |
| D703,227 | S | * | 4/2014 | Abratowski | D14/489 |
| D712,427 | S | * | 9/2014 | Fujioka | D14/486 |
| D726,763 | S | * | 4/2015 | Moon | D14/492 |
| D726,765 | S | * | 4/2015 | Dye | D14/492 |
| D727,965 | S | * | 4/2015 | Kwon | D14/492 |
| D730,938 | S | * | 6/2015 | Ma | D14/491 |
| D736,817 | S | | 8/2015 | Trabona et al. | |
| D738,381 | S | | 9/2015 | Kim et al. | |
| D738,385 | S | | 9/2015 | Lim et al. | |
| D740,322 | S | * | 10/2015 | Dye | D14/492 |
| D748,135 | S | * | 1/2016 | Kim | D14/485 |
| D749,632 | S | * | 2/2016 | Park | D14/489 |
| D752,609 | S | | 3/2016 | Lim | |
| D754,722 | S | * | 4/2016 | Xu | D14/488 |
| D756,414 | S | * | 5/2016 | Jin | D14/492 |
| D757,026 | S | | 5/2016 | Lim et al. | |
| D760,764 | S | | 7/2016 | Hwang et al. | |
| D761,316 | S | * | 7/2016 | Park | D14/492 |
| D766,954 | S | * | 9/2016 | Smith | D14/486 |
| D766,974 | S | | 9/2016 | Sano et al. | |
| D767,628 | S | * | 9/2016 | Kim | D14/488 |
| D769,325 | S | * | 10/2016 | Casalegno | D14/492 |
| D771,134 | S | | 11/2016 | Lee et al. | |
| D774,093 | S | * | 12/2016 | Dye | D14/492 |
| D775,207 | S | * | 12/2016 | Vulk | D14/492 |
| D779,556 | S | * | 2/2017 | Yuk | D14/492 |
| D792,444 | S | * | 7/2017 | Cho | D14/488 |
| D801,388 | S | * | 10/2017 | Sun | D14/492 |
| D802,017 | S | * | 11/2017 | Dragoi | D14/491 |
| D803,848 | S | * | 11/2017 | Hwang | D14/485 |
| D818,002 | S | * | 5/2018 | Park | D14/491 |
| D824,957 | S | * | 8/2018 | Seo | D14/491 |
| D826,263 | S | * | 8/2018 | Silva | D14/489 |
| D829,222 | S | * | 9/2018 | Choi | D14/485 |
| D829,241 | S | * | 9/2018 | Clapper | D14/489 |
| D829,764 | S | * | 10/2018 | Clapper | D14/489 |
| D835,664 | S | * | 12/2018 | Chaudhri | D14/487 |
| D838,742 | S | * | 1/2019 | Clapper | D14/489 |
| D853,442 | S | | 7/2019 | Lee | |
| D861,018 | S | | 9/2019 | Anzures et al. | |
| D861,037 | S | | 9/2019 | Carrigan et al. | |
| D867,396 | S | | 11/2019 | Ingel | |
| D873,284 | S | | 1/2020 | Dascola et al. | |
| D881,940 | S | | 4/2020 | Lee et al. | |
| D905,751 | S | | 12/2020 | Lee et al. | |
| D919,657 | S | * | 5/2021 | Hamaguchi | D14/492 |
| D933,100 | S | * | 10/2021 | Hamaguchi | D14/492 |
| 2004/0190729 | A1 | * | 9/2004 | Yonovitz | G01H 3/14 381/72 |
| 2008/0242356 | A1 | * | 10/2008 | Marui | H04W 4/16 455/566 |
| 2010/0175022 | A1 | | 7/2010 | Diehl et al. | |
| 2013/0060379 | A1 | * | 3/2013 | Choe | G06N 3/008 700/245 |
| 2015/0115971 | A1 | * | 4/2015 | Kim | G06F 1/3296 324/426 |
| 2016/0253071 | A1 | * | 9/2016 | Mishra | G06F 3/04817 715/811 |

OTHER PUBLICATIONS

"IOT Color 1." iconfinder.com. Nov. 18, 2017. Accessed Feb. 12, 2019. Available online at URL: <https://www.iconfinder.com/iconsets/iot-color1> (Year: 2017). (1 page).

"Multimedia photo and video." iconfinder.com. Jun. 11, 2017. Accessed Feb. 12, 2019. Available online at URL: <https://www.iconfinder.com/iconsets/multimedia-photo-and-video> (Year: 2017).*

"IOT Color 1." iconfinder.com. Nov. 18, 2017. Accessed Feb. 12, 2019. Available online at URL:<https://www.iconfinder.com/iconsets/iot-color1> (Year: 2017).*

* cited by examiner

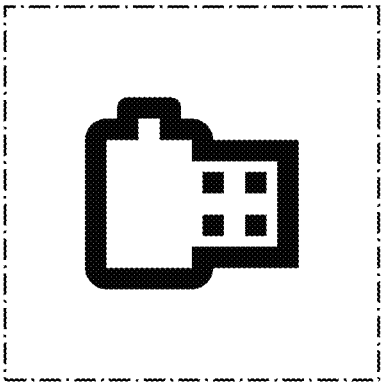
(New)